United States Patent [19]

Madison et al.

[11] Patent Number: 5,586,507
[45] Date of Patent: Dec. 24, 1996

[54] RAIL GUIDE WHEEL APPARATUS WITH DOUBLE OVERCENTER LINKAGE

[75] Inventors: Harry Madison, Memphis, Tenn.; Jeffrey L. Tilley, Glenwood, Iowa

[73] Assignee: Harsco Corporation, Wormleysburg, Pa.

[21] Appl. No.: 505,946

[22] Filed: Jul. 24, 1995

[51] Int. Cl.⁶ ........................................... B61F 1/00
[52] U.S. Cl. ........................................... 105/215.2
[58] Field of Search ..................... 105/215.2, 159, 105/72.2; 410/44, 45, 53, 56, 57, 77, 80

[56] References Cited

U.S. PATENT DOCUMENTS

| | | |
|---|---|---|
| 1,543,452 | 6/1925 | Seitz ........................ 105/215.2 |
| 2,655,873 | 10/1953 | McDonald . |
| 3,338,184 | 8/1967 | Fischer . |
| 3,653,332 | 4/1972 | Olson ........................ 105/215.2 |
| 3,701,323 | 10/1972 | Cox . |
| 3,704,671 | 12/1972 | Horne, Jr. et al. . |
| 3,738,285 | 6/1973 | Olson et al. . |
| 3,762,337 | 10/1973 | McKeon et al. . |
| 3,763,789 | 10/1973 | Olson et al. . |
| 3,886,870 | 6/1975 | Pelabon ........................ 105/49 |
| 3,980,025 | 9/1976 | Olson et al. . |
| 4,266,483 | 5/1981 | Rannanmaki . |
| 4,488,494 | 12/1984 | Powell, Sr. . |
| 4,537,137 | 8/1985 | White . |
| 4,583,465 | 4/1986 | Powell, Sr. . |
| 4,708,066 | 11/1987 | Heckman . |
| 5,016,544 | 5/1991 | Woollam . |
| 5,018,453 | 5/1991 | Kinard . |
| 5,090,332 | 2/1992 | Edwards . |
| 5,154,124 | 10/1992 | Madison . |
| 5,186,109 | 2/1993 | Madison . |

Primary Examiner—Robert J. Oberleitner
Assistant Examiner—C. T. Bartz
Attorney, Agent, or Firm—William L. Feeney; Kerkam, Stowell, Kondracki & Clarke, P.C.

[57] ABSTRACT

A guide wheel apparatus and vehicle typically used in railroad applications, using the apparatus has a double overcenter linkage arrangement to secure rail wheels in both road and rail positions for respectively traveling on roads and rails. An electric motor is coupled to the linkage by way of a planetary gear train.

17 Claims, 7 Drawing Sheets

RAIL GUIDE WHEEL APPARATUS WITH DOUBLE OVERCENTER LINKAGE

BACKGROUND OF THE INVENTION

The present invention relates to guide wheel equipment of the type used for allowing road vehicles to travel along rails of a railroad track. It further relates to a vehicle having such rail guide wheel equipment mounted thereon.

As used herein, a road vehicle is a vehicle having wheels which contact a highway or other road, as opposed to only having wheels which roll on rails on a railroad track.

Railroad service crews often have to go to various places along a railroad track in order to make repairs and inspections. Depending upon the type of service which is performed and other factors, the service crew may ride to the work site using a rail vehicle or using a road vehicle, such as a truck or car. Since the best way to a work site may include travel along a road and travel along a railway, service crews and other rail workers often have used road vehicle having a rail engagement or guide wheel apparatus mounted on them. Such cars or trucks may travel along a highway or other road with road wheels engaging the road. Upon getting to an appropriate place along the railway, the rail engagement apparatus is operated such that railway wheels are lowered from the vehicle until the vehicle is bound to the railway. Such vehicles include an apparatus at the front of the vehicle which lifts the front road wheels off the ground or at least takes some loading off the front road wheels when two front railway wheels engage rails and an apparatus at the back of the vehicle, which apparatus secures the back of the vehicle to the rails by two back railway wheels. The two back railway wheels allow the regular road wheels to contact the rails or other surface such that the road wheels may provide traction to move the vehicle even when the two front railway wheels and two back railway wheels have secured the vehicle to the rail. When the vehicle wishes to leave the railway, the two front railway wheels and the two back railway wheels are retracted or lifted up such that the vehicle may again run along the road. In those units where the front road wheels contact a lower surface even in the rail mode, the front road wheels may help in braking the vehicle.

Various structures have been used to allow railway wheels to be attached to road vehicles. Although such structures have been generally useful at moving the railway wheels between an upper position in which the vehicle may travel along a highway or other road and a lower position in which the vehicle travels along a railway, such structures have often been subject to one or more of several disadvantages.

Such structures move the rail guide wheels between an upper road position corresponding to a highway or road mode and a lower rail position corresponding to a rail mode. In the road mode, the rail guide wheels are in their upper road position such that road wheels move and control the vehicle movement along a highway or other road surface. In the rail mode, the rail guide wheels are in their lower rail position such that the vehicle is engaged to the rails of a railroad track for movement thereon. The rear road wheels of the vehicle still provide the propulsion, although the weight on those wheels is somewhat reduced by the lowering of a back pair of rail wheels.

Such prior designs of guide wheel structures require that the guide wheel structure be stable when the guide wheels are in their road and in their rail positions. Mechanisms are used for raising and lowering the rail guide wheels. In order to stabilize the rail engagement wheels in both rail and road positions, various techniques have been used.

Commonly, locking pins or similar devices are manually placed or manipulated to lock the mounting structures of the wheels in the road and/or the rail positions. These generally work well, but they require extra time for the vehicle driver or other worker to perform the manual manipulation.

Other locks have been used which provide automatic locking in at least one of the positions (road or rail), but such mechanisms often add to the cost and complexity of the design. Depending upon how complex they are and the specifics of their design, malfunction or improper operation may be a problem.

At least one prior design has used an overcenter linkage which is stabilized in one position by use of a link which goes to an overcenter position such that it and the attached guide wheel supports will be quite stable in that position. However, the opposite position (road or rail) will still require other locking or stabilizing techniques.

A further disadvantage of prior guide wheel structures is that they usually require a relatively high torque in order to move between rail and road positions. Since hydraulic cylinders are used to provide the high torque requirements, this in turn requires that a hydraulic system be added to the road vehicle on which the guide wheel structures are added. Adding the hydraulic components increases the weight, cost, and complexity of the road/rail vehicle which is usually constructed by modifying a road vehicle.

OBJECT AND SUMMARY OF THE INVENTION

Accordingly, it is a primary object of the present invention to provide a new and improved rail guide wheel apparatus and vehicle using such an apparatus.

A more specific object of the present invention is to provide a guide wheel apparatus which simply and without locking pins or other manual manipulations insures that rail guide wheels are stabilized in both rail and road positions.

Yet another object of the present invention is to provide a rail guide wheel apparatus using a linkage which uses overcenter stabilization in both rail and road positions.

A further object of the present invention is to provide a rail guide wheel apparatus which can easily be adjusted to conform to variations in a particular vehicle to which it is attached.

Yet another object of the present invention is to provide a rail guide wheel apparatus which can automatically provide overload protection by blocking change into the rail mode if a rail guide wheel would be overloaded.

A further object of the present invention is to provide a rail guide wheel apparatus which can operate using an electric motor.

The above and other features of the present invention which will be more readily understood when the following detailed description is considered in conjunction with the accompanying drawings are realized by a rail guide wheel apparatus including:

a first rail engagement wheel;

a first rail arm having a wheel end on which the first rail engagement wheel is rotatably mounted and a mount end;

a second rail engagement wheel;

a second rail arm having a wheel end on which the first rail engagement wheel is rotatably mounted and a mount end; and a position adjustor operably connected to move each of the first and second rail wheels between rail positions whereat they may engage rails and road positions whereat they are removed from any road surface; and wherein each of the first and second rail wheels is automatically secured against changing in either way between rail and road positions. The present apparatus may be combined with a road vehicle to which the apparatus is mounted such that the road vehicle may travel on roads with the first and second rail wheels in their road positions and may travel on rails of a railroad track with the first and second rail wheels in their rail positions.

The present invention may alternately be described as a rail guide wheel apparatus including:

a first rail engagement wheel;

a first rail arm having a wheel end on which the first rail engagement wheel is rotatably mounted and a mount end;

a second rail engagement wheel;

a second rail arm having a wheel end on which the first rail engagement wheel is rotatably mounted and a mount end; and a position adjustor linkage structure operably connected to move each of the first and second rail wheels between rail positions whereat they may engage rails and road positions whereat they are removed from any road surface; and wherein each of the first and second rail wheels is automatically secured against changing between rail and road positions by the position adjustor linkage structure assuming a rail overcenter state corresponding to the rail positions and a road overcenter state corresponding to the road positions.

The present invention may alternately be described as a rail guide wheel apparatus including:

a first rail engagement wheel;

a first rail arm having a wheel end on which the first rail engagement wheel is rotatably mounted and a mount end;

a second rail engagement wheel;

a second rail arm having a wheel end on which the first rail engagement wheel is rotatably mounted and a mount end;

a position adjustor operably connected to move each of the first and second rail wheels between rail positions whereat they may engage rails and road positions whereat they are removed from any road surface; and an electric motor operably connected to the position adjustor to move each of the first and second rail wheels from one of the rail and road positions to another of the rail and road positions.

The present invention may alternately be described as a rail guide wheel apparatus including:

a first rail engagement wheel;

a first rail arm having a wheel end on which the first rail engagement wheel is rotatably mounted and a mount end;

a second rail engagement wheel;

a second rail arm having a wheel end on which the first rail engagement wheel is rotatably mounted and a mount end;

a position adjustor operably connected to move each of the first and second rail wheels between rail positions whereat they may engage rails and road positions whereat they are removed from any road surface; and a motor operably connected to the position adjustor to move each of the first and second rail wheels from the road positions to the rail positions; and wherein the motor is will be unable to move at least one of the first and second rail wheels from its road position to its rail position if a vehicle to which the apparatus is attached would overload that rail wheel upon assuming its rail position. As used herein, a motor is anything that produces or imparts motion and is not limited to an electric motor except where expressly stated.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
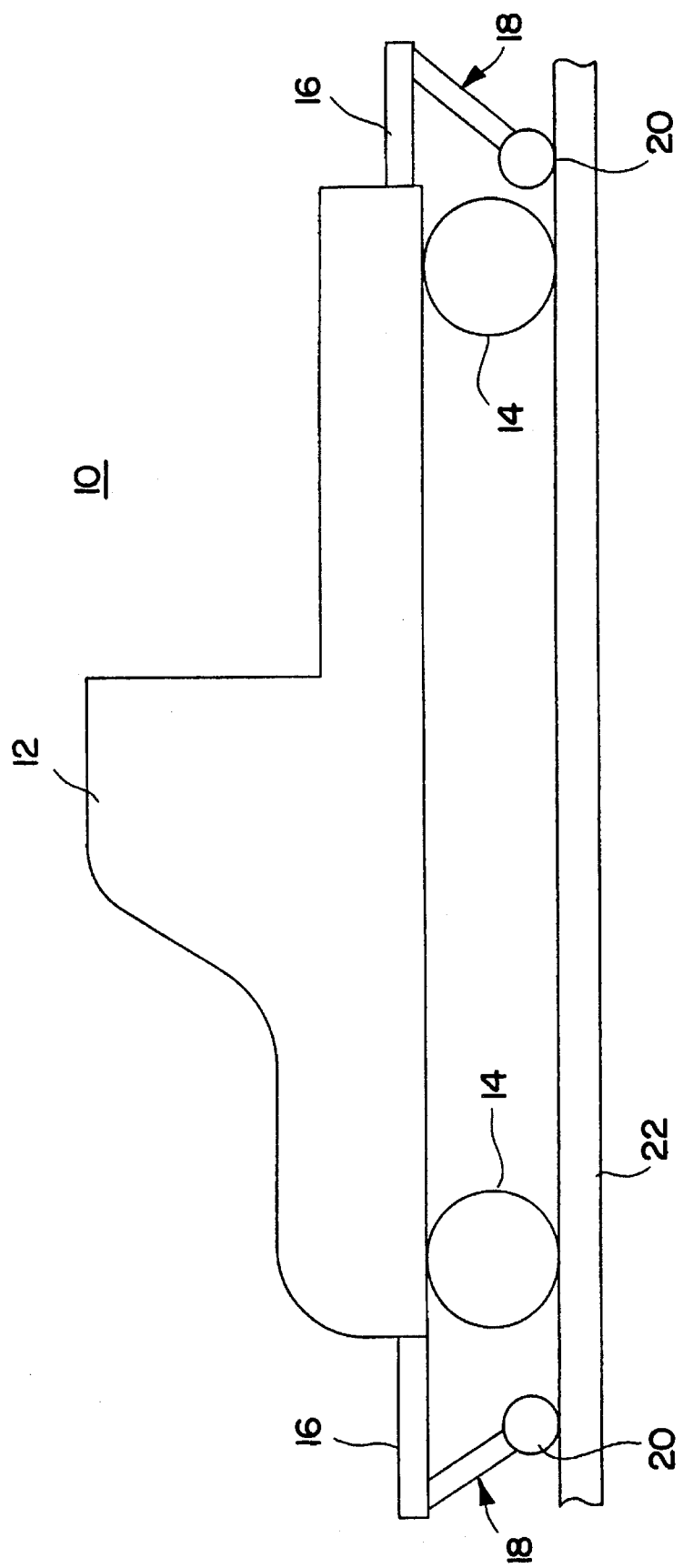
FIG. 1 is a simplified side view of a vehicle according to the present invention.

With reference initially to FIG. 1, the vehicle 10 of the present invention is a road vehicle 12 with road wheels 14. The road vehicle 12 has been modified to have frame extensions 16 at the front and back thereof in known fashion. The frame extensions 16 have rail guide wheel apparatuses 18 mounted thereon with each apparatus 18 having a pair of rail wheels 20 on it. The vehicle may travel down a road in a highway or road mode, not shown, in which traction and control is provided by two front and at least two back road wheels 14. Alternately, and as shown, the vehicle may travel in a rail mode with two front and two back rail wheels 20 engaging rails 22 of a railroad track. In the rail mode, the front pair of rail wheels 20 take some loading of the front road wheels as shown (or alternately lift the front road wheels 14 off of surfaces therebelow), whereas the back pair of rail wheels 20 hold the back of the vehicle to the rails and receive part of the weight load which would otherwise be applied to the back road wheels 20. At the same time, the back road wheels are still sufficiently weighted or loaded such that they may contact the top of rail 22 or other surfaces below them for providing traction and moving the vehicle.

As will be readily appreciated, the simplified view of FIG. 1 is from the left side of the vehicle 10 and the unseen right side would be symmetric thereto having a front right rail wheel, a front right road wheel, a back right road wheel, and a back right rail wheel. For ease of illustration and discussion, the guide wheel apparatus 18 will be understood as having symmetric right and left sides except where otherwise noted. Moreover, the apparatus 18 at the front of the vehicle and the apparatus 18 at the back of the vehicle are constructed in identical fashion, such that they need not be separately described. They may be adjusted slightly differently and mounted slightly differently if desired to realize the rail mode illustrated in FIG. 1.

The simplified view of FIG. 1 shows vehicle 10 as a modified truck 12, but other road vehicles could be modified using the rail guide wheel apparatus discussed. However, the apparatus is especially well suited for vehicles from 5000 to 9200 lbs. G.V.W.R.

Figure 2:
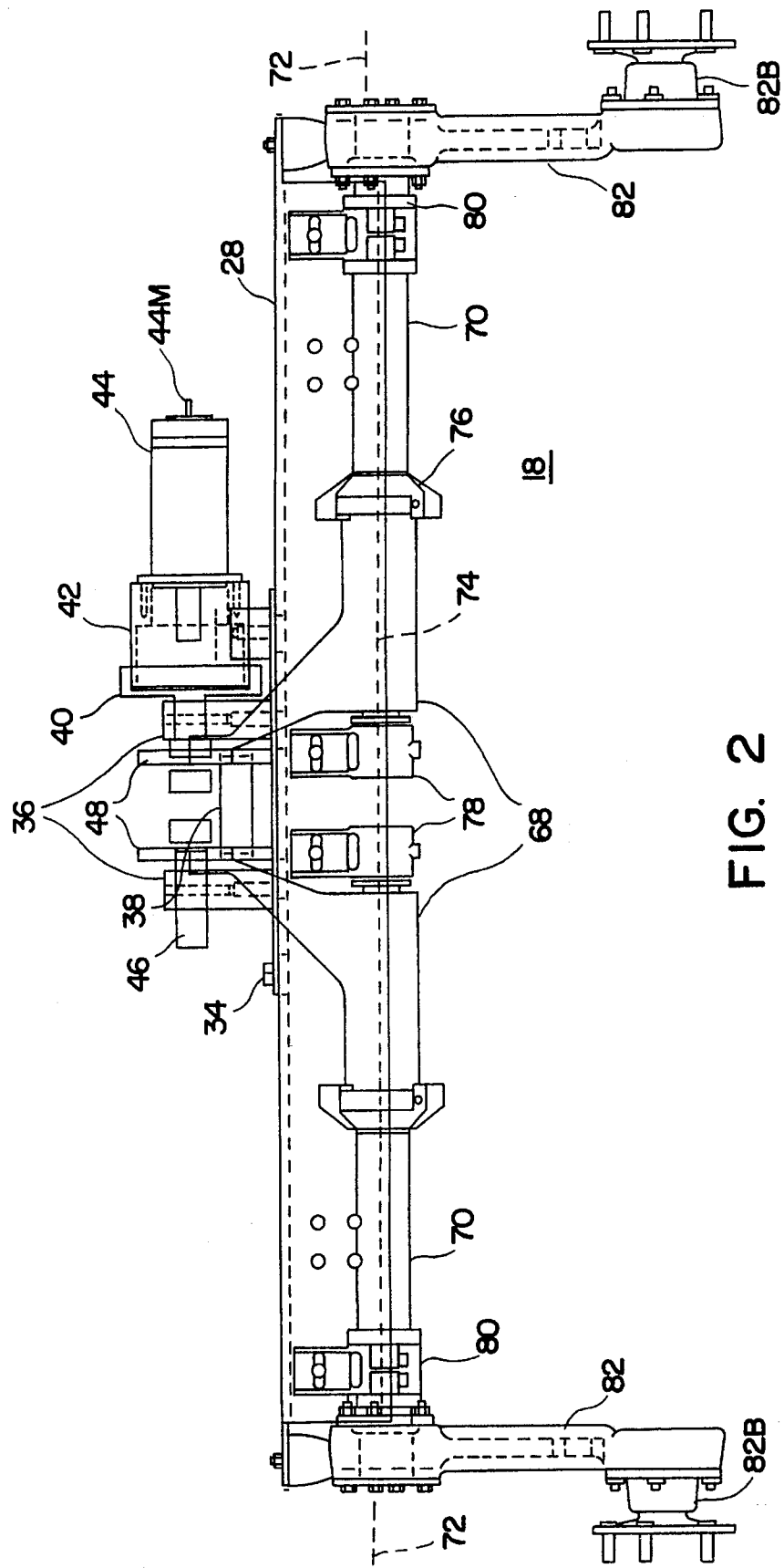
FIG. 2 is a front view of a guide wheel apparatus according to the present invention.
Figure 3:
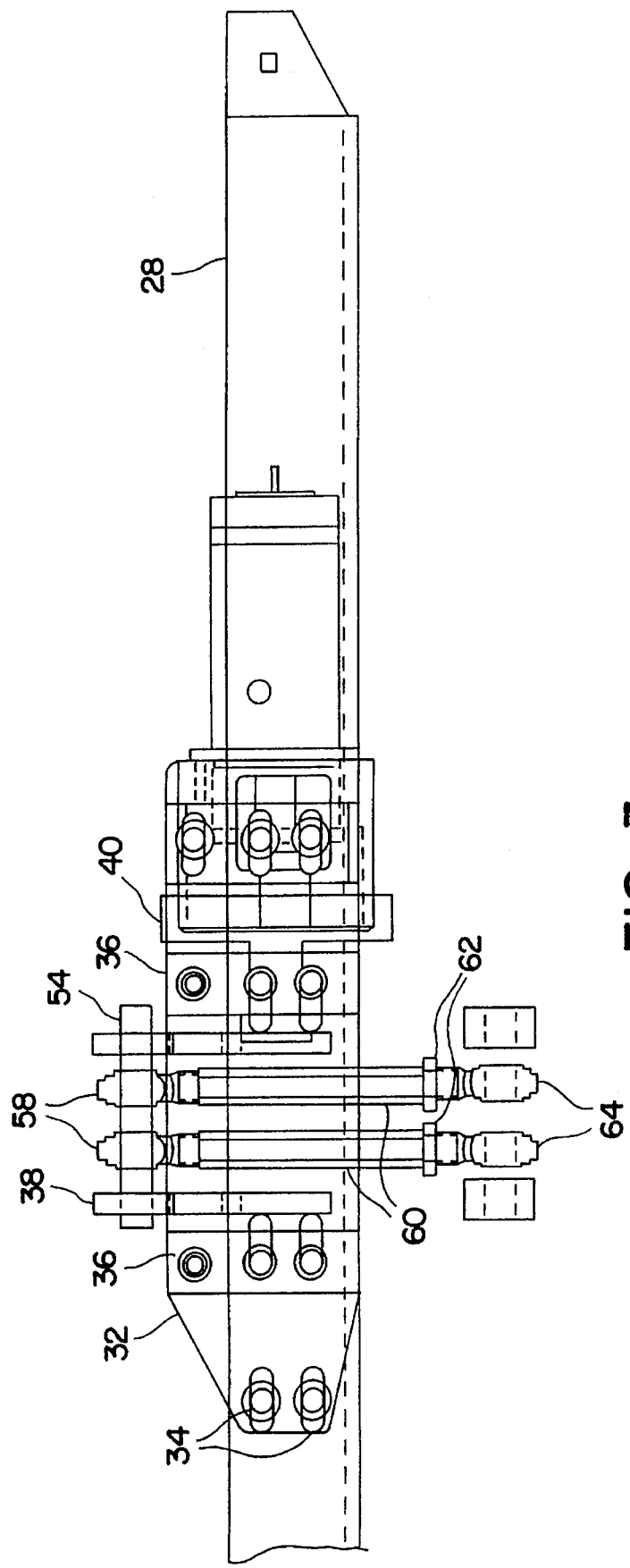
FIG. 3 is a top view of parts of the guide wheel apparatus of FIG
Figure 4:
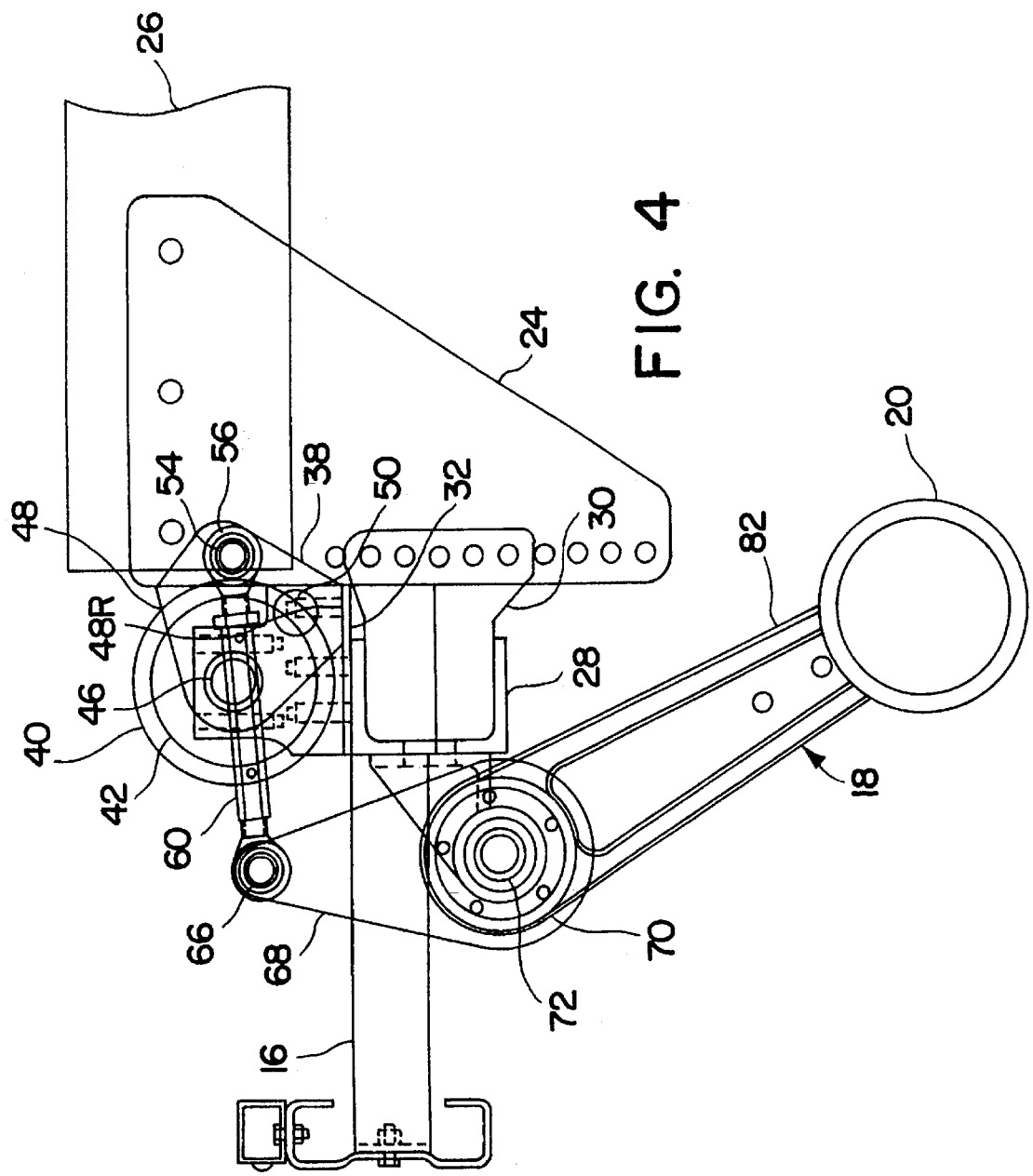
FIG. 4 is a side view of the guide wheel apparatus of FIG. 2 with some related parts and with the guide wheel apparatus in a rail mode.

Turning now to FIGS. 2–4, the construction of the rail guide wheel apparatus 18 will be discussed. In the discussion which follows, it will be assumed that the apparatus is mounted at the front of a vehicle, but it could also be mounted at the back of a vehicle, in which case right and left designations would be reversed. The apparatus 18 is mounted by opposite side mount brackets 24 to opposite side vehicle frame rails 26, only the left ones of the components 24 and 26 being shown in FIG. 4. The apparatus 18 includes a cross channel member 28 extending transversely (right to left relative to the direction of vehicle movement) and secured to the right and left brackets 24 by corresponding right and left mount plates such as left side plate 30 of FIG. 4.

Cross channel member 28 serves as a support for various other components of the apparatus 18. A base plate 32 is adjustably secured to the cross channel member 28 by slots in plate 32 and eleven corresponding fasteners 34 (only some labeled), as best shown in FIG. 3. Crank bearing blocks 36 on plate 32 rotatably support a crankshaft 38 having an adapter 40 fixed thereto. The adapter 40 allows the crankshaft 38 to be driven by a planetary gear train within gear housing 42, which gear train is in turn driven by permanent magnet direct current electric motor 44. Since only one adapter 40, only one gear housing 42 and only one DC motor 44 are needed for the apparatus 18, these are among the few parts of apparatus 18 which are not symmetric with respect to right and left sides. A manual over ride shaft 44S allows one to move the crankshaft 38 (and in turn other parts of apparatus 18) manually using a tool, not shown, if the motor 44 or its unshown electrical controls and power supply fail to work. The crankshaft 38 serves as a position adjustor to adjust the apparatus between rail and road modes.

Advantageously, the motor 44 provides overload protection. That is, it will stall if the vehicle 10 has been weighted down so much that the guide wheel apparatus would be overloaded in the rail mode. For example, and in a preferred embodiment, the permanent magnet motor size allows about 700 lbs. of load per guide wheel. The motor will stall if the load is greater than about 1400 lbs. per apparatus (i.e., apparatus 18 at vehicle front or apparatus 18 at vehicle back). As the attempt is made to shift from the road mode to the rail mode in the detailed fashion discussed below, the motor will stall to block such a mode change if the vehicle would overload 20 the ratings for the guide wheel apparatus.

Figure 7:
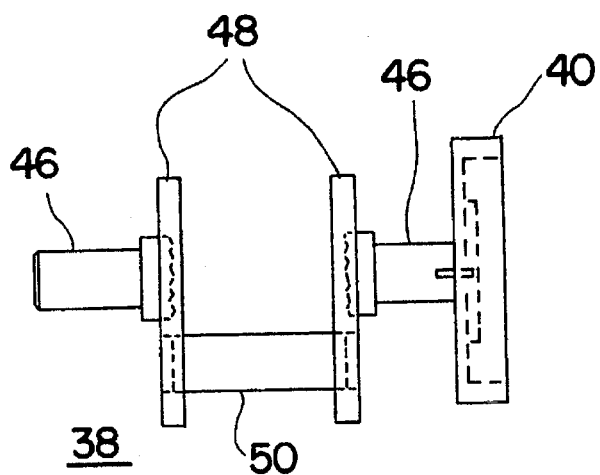
FIGS. 7, 8, and 9 are respectively front, side, and perspective views of a crankshaft.
Figure 8:
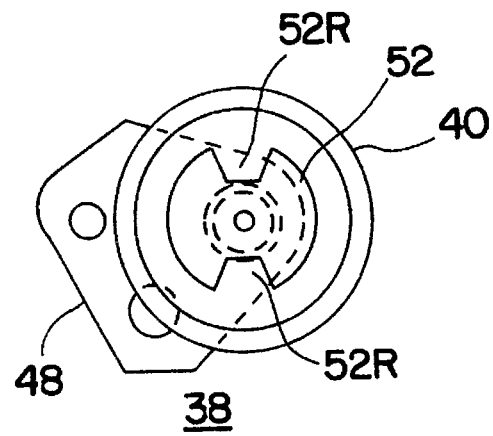
Figure 9:
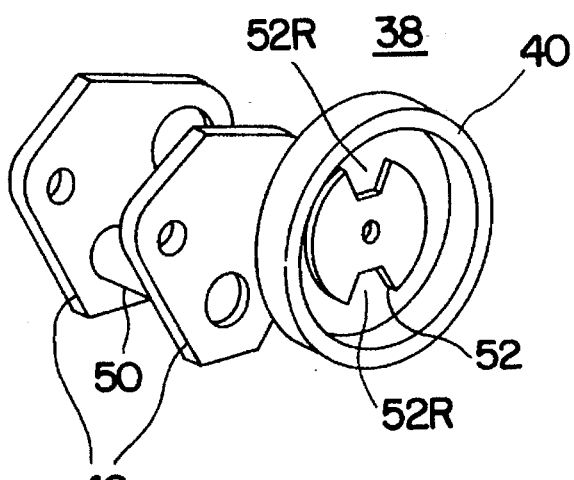

With reference now also to FIGS. 7–9 as well as FIGS. 2–4, the crankshaft 38 includes opposite end axially in line journal rods 46 which rotatably support crankshaft 38 to holes in the bearing blocks 36, opposite side crank plates 48, and a crankshaft central rod 50. Central rod 50 may also be called an offset pin (i.e., it is offset from the common axis of journal rods 46). The adapter 40 is shaped like a ring with a floor having a plate 52 to create recessed portions 52R (see FIGS. 8 and 9) into which a drive from the planetary gear may seat for coupling thereto. The planetary gear is discussed in more detail below.

Offset from the offset pin or central rod 50 of crankshaft 38 and offset from the journal rods 46 is a bolt 54 (FIG. 3) extending through holes 56 (FIG. 4) in the plates 48. Spherical rod ends 58 (FIG. 3) of adjustable length linkages 60 are attached to the bolt 54, spacers not being shown for ease of illustration. Changing the length of the linkages 60 by adjusting lock nuts 62 changes rail wheel arm angles to optimize operation of the apparatus 18. Spherical rod ends 64 of right and left linkages 60 are separately bolted by bolts 66 (one only shown in FIG. 4) to corresponding right and left torque couplers 68.

With reference primarily to FIG. 2, movement of the linkages 60 causes the torque couplers 68 to rotate right and left tube and shaft assemblies 70 about corresponding axes 72. (The axes 72 may well be collinear, but adjustments for a given vehicle, such as a vehicle having minor deviations in symmetry, may make it better to have them non-collinear.)

A rubber cord suspension 74 or other type of torsion suspension, such as commonly used for trailer axles, is inside each of the torque couplers 68, whereas over travel stops 76 serve to limit travel. The suspensions 74 cushions and dampens the vehicle's ride on the rails. Further, the suspensions 74 ensures that the guide wheels stay in contact with the corresponding rails to prevent the vehicle from leaving the track inadvertently. The tube and shaft assemblies 70 are journaled to corresponding right and left inner suspension blocks 78 and corresponding right and left outer suspension blocks 80. The suspension blocks 78 and 80 have slots for adjustably bolting them to the cross channel member 28 to allow for gauge and other adjustments. Placing shims, not shown, between an inner block 78 and the cross channel member 28 and/or an outer block 80 and cross channel member 28 allows for ready adjustment of a unit's (right side or left side are individually adjustable) toe setting.

Rotation of the tube and shaft assemblies 70 in turn pivots corresponding right and left wheel arms 82 (the part of apparatus 18 visible in FIG. 1) about the axes 72. Bearings 82B provide rotatable mounting of the rail wheels 20 (not in FIG. 2, see FIG. 4).

Figure 5:
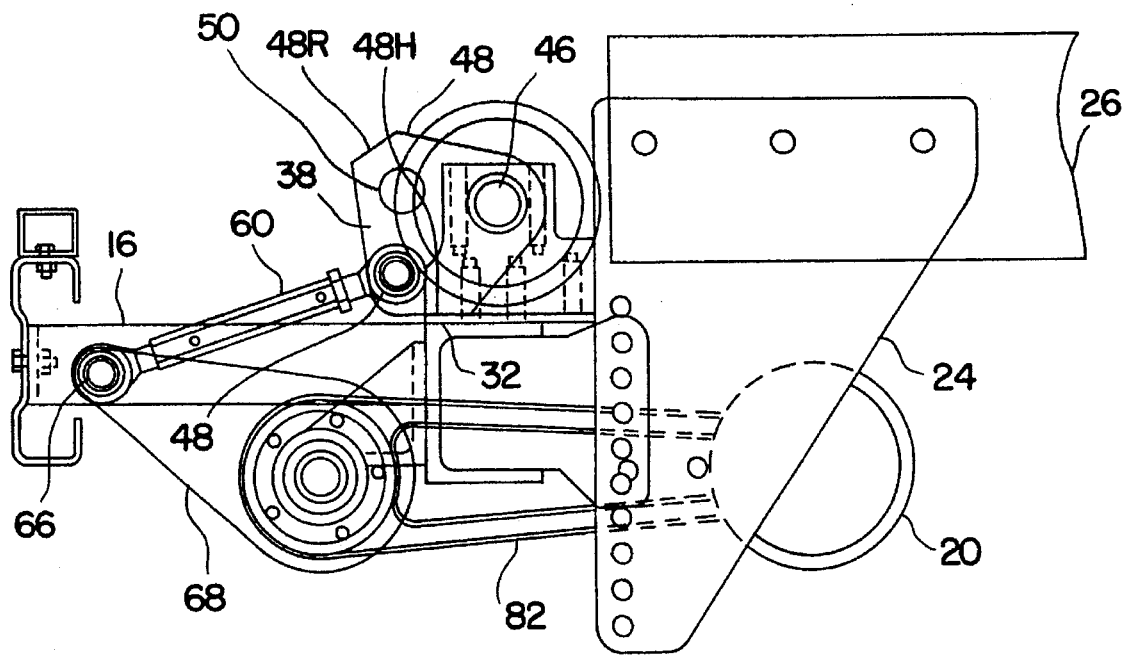
FIG. 5 is a side view of the guide wheel apparatus of FIG. 2 with some related parts, similar to FIG. 4 except that the guide wheel apparatus is in a road mode.

Considering now primarily FIGS. 4 and 5, each rail wheel 20 may be moved between its rail position of FIG. 4 and its highway or road position of FIG. 5 by operation of the motor 44 of FIG. 2.

In the rail position of FIG. 4, each linkage 60 is in a rail overcenter state or position and a rail stop surface 48R of crankshaft plate 48 is against the base plate 32. As well known, an overcenter state is quite stable. If torque coupler 68 has a counterclockwise (relative to view of FIG. 4) torque applied to it by rail wheel 20 tending to rotate wheel arm 82 counterclockwise, this will not rotate crankshaft 38 (see its plate 48) counterclockwise about its journal rod 46. Instead, and since linkage has traveled past the axis of journal rod 46, any such torque will maintain surface 48R against base plate 32 and maintain rail wheel 20 in its rail position. Surface 48R bearing against base plate 32 will block any clockwise rotation of crankshaft 38 from its FIG. 4 position and, in turn, block any clockwise movement of wheel arm 82 (aside from small movements resulting from operation of the torsion suspension). Most importantly then, the apparatus 18 is secured by operation of linkage 60 and associated components against inadvertently changing from rail mode (wheel 20 in rail position) to the highway or road mode of FIG. 5 where the wheel is in highway or road position.

In the FIG. 5 highway or road mode, the rail wheel 20 is in a highway or road position allowing a vehicle such as 10 of FIG. 1 to travel on a highway or other road with rail wheels lifted from any ground or road surfaces therebelow. In this mode, a highway or road stop surface 48H bears against the base plate 32. The linkage 60 is now in an overcenter highway or road state. The linkage 60 cannot, due to any loading from weight, vibration, hitting bumps, or other forces, cause counter-clockwise rotation of the crankshaft 38 from its FIG. 5 position because linkage 60 has rotated past the central axis of journal rods 46. Any tendency of linkage 60 to cause movement by pushing on crankshaft plate 48 is blocked by surface 48R bearing against base plate 32. Movement in the other direction is blocked by linkage 60 and the inertia of the planetary gear train discussed below, which gear train is indirectly connected to linkage 60 by way of crankshaft 38. Linkage 60 is thus secured against movement and wheel arm 82 and wheel 20 are blocked against moving from their highway or road positions to their rail positions.

By using the crankshaft 38 having the linkages 60 attached at points offset from the crankshaft axis of rotation corresponding to journal rods, automatic, overcenter securing is provided for both rail and road positions. The linkage 60 travels over center by 5 to 10 degrees in both rail and road positions before the base plate 32 blocks further movement. The operator or person driving the vehicle need not insert locking pins or even take any action other than causing a shift between rail and road modes.

The double overcenter (i.e., overcenter in both rail and road states) linkage 60 is the preferred way to automatically secure the rail wheels against changing in either way between rail and road positions. It is automatic in securing in both road and rail positions in that the securing does not require any person to take any other step beyond causing motor 44 to change the positions. Advantageously, the double overcenter linkage also automatically unsecures the apparatus from both its road and rail positions in that it does not require any person to take any other step beyond causing motor 44 to change the positions. The double overcenter linkage effectively locks (i.e., secures it in a given state, road or rail) and unlocks (i.e., releases it from its current state) automatically.

Although the double overcentering linkage 60 is the used by the preferred embodiment, the present invention in its broadest aspects includes any other mechanism or arrangement which automatically secures a guide wheel apparatus in both rail and road states. For example, a linkage might use overcenter stability for securing rail wheels in position for one of the states (rail or road) and use a springed hook, not shown, capturing offset pin 50 of crankshaft 38 to automatically secure the rail wheels in the other of the states (rail or road).

Figure 6:
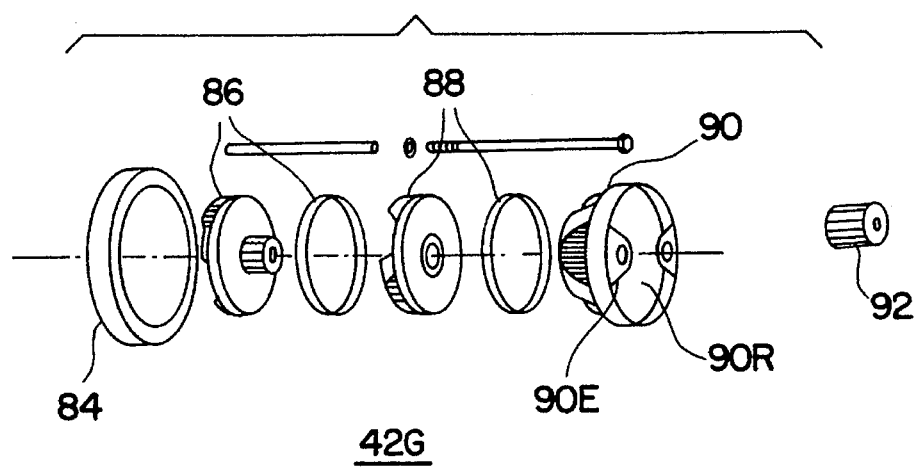
FIG. 6 is an exploded perspective of a planetary gear arrangement used as part of the preferred embodiment guide wheel apparatus.

With reference now to FIG. 6, a known type of planetary gear train 42G may be used in housing 42 (refer back to FIG. 2). The gear train 42G has ring gear 84, a first stage planet assembly 86 with bearing, a second stage planet assembly 88 with bearing, a third stage planet assembly 90, and a free wheel gear 92. The third stage assembly 90 has elevated portions 90E and recessed portions 90R such that recessed portions 52R (refer back to FIG. 9) of adapter 40 may receive the elevated portions 90E therein such that power from gear train 42G is applied to the crankshaft 38 (FIG. 2).

Considering FIGS. 2 and 6 in conjunction, the motor 44 is bolted to housing 42 and would have its output shaft, not separately shown, directly coupled to the first stage planet gear 86. The ratio of the gear drive is 216:1 in a particular preferred embodiment.

Figure 10:
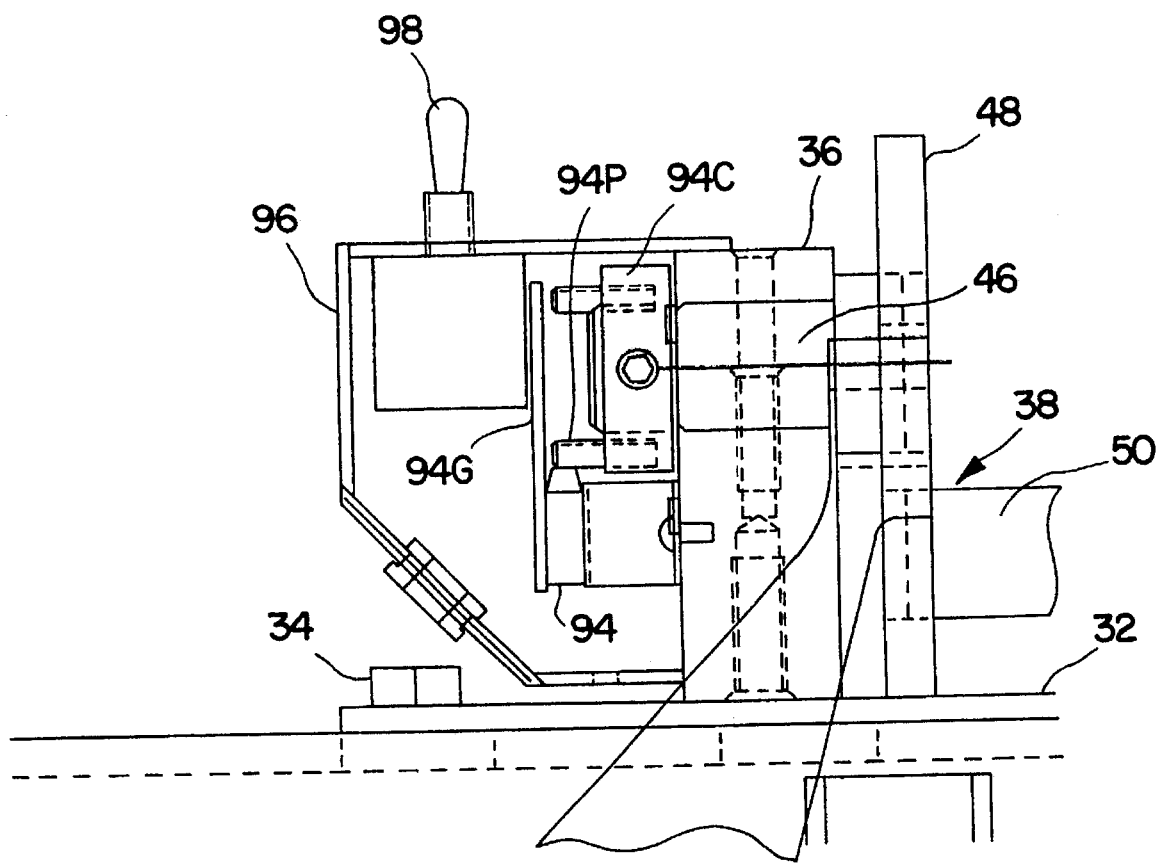
FIG. 10 is a front view of an indicator arrangement.
Figure 11:
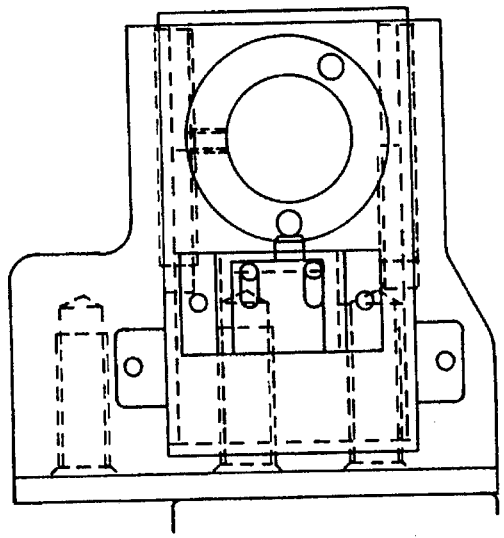
FIG. 11 is a side view of the indicator arrangement.

With reference now to FIGS. 10 and 11, an indicator switch 94 and other components, not shown in earlier FIGS., may be mounted adjacent the bearing block 36 opposite the end on which the motor 44 of FIG. 2 is mounted. A collar 94C is secured to journal rod 46 of the crankshaft 38 and has two roll pins 94P mounted to it. In the overcenter rail position, one of roll pins 94P closes the switch 94 to cause an indicator light, not shown, in the vehicle passenger compartment to light, thus indicating to the driver that the overcenter position has been reached. In the overcenter road position, rotation of crankshaft 38 will have rotated the other of roll pins 94P in contact with switch 94 for closing the microswitch. Thus, the same indicator light will light whenever the crankshaft is in a position corresponding to either the rail position or the road position. A wire guard 94G keeps unshown wires from catching on pins 94P.

A cover 96 is mounted to bearing block 36 and has toggle switch 98 mounted to it. Thrown one way, the switch 98 causes the motor 44 of FIG. 2 to rotate the rail wheels into road positions. Thrown the other way, the switch 98 causes the motor 44 to rotate the rail wheels into rail positions. If desired, one may also have a switch, not shown, to retract the rail wheels (move them from rail to road positions) from inside the passenger compartment of vehicle 10.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A rail guide wheel apparatus comprising:

a first rail wheel;

a first rail arm having a wheel end on which the first rail wheel is rotatably mounted and a mount end;

a second rail wheel;

a second rail arm having a wheel end on which the first rail wheel is rotatably mounted and a mount end; and a position adjustor operably connected to move each of the first and second rail wheels between rail positions whereat they may engage rails and road positions whereat they are removed from any road surface; and wherein each of the first and second rail wheels is automatically secured against changing in either way between rail and road positions; and wherein the position adjustor includes a linkage structure movable between an overcenter rail state and an overcenter road state, each of the overcenter rail and road states securing the first and second rail wheels against changing between their rail and road positions; and further comprising: first and second wheel arms having the respective first and second rail wheels mounted on wheel ends thereof, each of the first and second wheel arms are pivotable about corresponding first and second wheel arm axes; at least one torque member operable to apply torque for moving at least one of the first and second wheel arms about the corresponding one of the first and second wheel arm axes; and wherein the linkage structure includes at least one linkage and one crank member pivotably connected thereto, the crank member rotating about a crank axis and the linkage directly connected to the torque member.

2. The rail guide wheel apparatus of claim 1 further combined with a road vehicle to which the apparatus is mounted such that the road vehicle may travel on roads with the first and second rail wheels in their road positions and may travel on rails of a railroad track with the first and second rail wheels in their rail positions.

3. The rail guide wheel apparatus of claim 1 further comprising a motor operably connected to the position adjustor to move each of the first and second rail wheels from the road positions to the rail positions; and wherein the motor is unable to move at least one of the first and second rail wheels from its road position to its rail position if a vehicle to which the apparatus is attached would overload that rail wheel upon assuming its rail position.

4. The rail guide wheel apparatus of claim 1 wherein the position adjustor further includes a crankshaft mounted for rotation about a crankshaft axis and wherein the linkage is pivotably secured to the crankshaft by the crank member at a location offset from the crankshaft axis in a direction perpendicular to the crankshaft axis.

5. The rail guide wheel apparatus of claim 1 wherein the linkage structure includes first and second linkages, each movable between an overcenter rail state and an overcenter road state, each of the overcenter rail and road states of the first and second linkages respectively securing the first and second rail wheels against changing between their rail and road positions.

6. The rail guide wheel apparatus of claim 5 wherein each of the first and second linkages is an adjustable length linkage.

7. The rail guide wheel apparatus of claim 5 wherein the position adjustor further includes a crankshaft mounted for rotation about a crankshaft axis and wherein each of the first and second linkages is pivotably secured to the crankshaft by first and second crank members at locations offset from the crankshaft axis in a direction perpendicular to the crankshaft axis.

8. The rail guide wheel apparatus of claim 1 further comprising an electric motor operably connected to the position adjustor to move each of the first and second rail wheels from one of the rail and road positions to another of the rail and road positions.

9. A rail guide wheel apparatus comprising:
   a first rail engagement wheel;
   a first rail arm having a wheel end on which the first rail engagement wheel is rotatably mounted and a mount end;
   a second rail engagement wheel;
   a second rail arm having a wheel end on which the first rail engagement wheel is rotatably mounted and a mount end; and
   a position adjustor linkage structure operably connected to move each of the first and second rail wheels between rail positions whereat they may engage rails and road positions whereat they are removed from any road surface; and
wherein each of the first and second rail wheels is automatically secured against changing between rail and road positions by the position adjustor linkage structure assuming a rail overcenter state corresponding to the rail positions and a road overcenter state corresponding to the road positions; and further comprising a motor operably connected to the position adjustor to move each of the first and second rail wheels from the road positions to the rail positions; and wherein the motor is unable to move at least one of the first and second rail wheels from its road position to its rail position if a vehicle to which the apparatus is attached is so heavy that the motor would overload, and thus is not able to provide the torque to move the position adjuster linkage past the rail overcenter state, so that the rail wheel would be able to assume its rail position.

10. The rail guide wheel apparatus of claim 9 wherein the electric motor is operably connected to the position adjustor to move each of the first and second rail wheels from the road positions to the rail positions; and wherein the electric motor will stall and be unable to move at least one of the first and second rail wheels from its road position to its rail position if a vehicle to which the apparatus is attached would overload that rail wheel upon assuming its rail position.

11. A rail guide wheel apparatus comprising:
    a first rail engagement wheel;
    a first rail arm having a wheel end on which the first rail engagement wheel is rotatably mounted and a mount end;
    a second rail engagement wheel;
    a second rail arm having a wheel end on which the first rail engagement wheel is rotatably mounted and a mount end;
    a position adjustor operably connected to move each of the first and second rail wheels between rail positions whereat they may engage rails and road positions whereat they are removed from any road surface; and
    a motor operably connected to the position adjustor to move each of the first and second rail wheels from the road positions to the rail positions; and
wherein the motor is unable to move at least one of the first and second rail wheels from its road position to its rail position if a vehicle to which the apparatus is attached is so heavy that the motor would overload, and thus is not able to provide the torque to move the position adjuster linkage past the rail overcenter state, so that the rail wheel would be able to assume its rail position.

12. The rail guide wheel apparatus of claim 11 wherein the drive is an electric motor operably connected to the position adjustor to move each of the first and second rail wheels from its road position to its rail position and wherein the electric motor will stall and be unable to move both of the first and second rail wheels from their road positions to their rail positions if a vehicle to which the apparatus is attached would overload the first and second rail wheels upon assuming their rail positions.

13. The rail guide wheel apparatus of claim 12 wherein each of the first and second rail wheels is automatically secured against changing in either way between rail and road positions.

14. A rail guide wheel apparatus comprising:
    a first rail engagement wheel;
    a first rail arm having a wheel end on which the first rail engagement wheel is rotatably mounted and a mount end;
    a second rail engagement wheel;
    a second rail arm having a wheel end on which the first rail engagement wheel is rotatably mounted and a mount end;
    a position adjustor operably connected to move each of the first and second rail wheels between rail positions whereat they may engage rails and road positions whereat they are removed from any road surface; and
    an electric motor operably connected to the position adjustor to move each of the first and second rail wheels from one of the rail and road positions to another of the rail and road positions; and
wherein the electric motor is operably connected by the position adjustor to the first and second rail arms such that power is supplied only to the mount ends of the first and second rail arms.

15. The rail guide wheel apparatus of claim 14 further comprising a planetary gear train operably connected between the electric motor and the position adjustor.

16. The rail guide wheel apparatus of claim 14 wherein the electric motor is operably connected to the position adjustor to move each of the first and second rail wheels from the road positions to the rail positions; and wherein the electric motor will stall and be unable to move at least one of the first and second rail wheels from its road position to its rail position if a vehicle to which the apparatus is attached would overload that rail wheel upon assuming its rail position.

17. The rail guide wheel apparatus of claim 16 wherein the position adjustor includes a linkage structure movable between an overcenter rail state and an overcenter road state, each of the overcenter rail and road states securing the first and second rail wheels against changing between their rail and road positions.

* * * * *